United States Patent
Guen

(10) Patent No.: US 9,768,434 B2
(45) Date of Patent: Sep. 19, 2017

(54) RECHARGEABLE BATTERY

(71) Applicant: SAMSUNG SDI CO., LTD., Yongin-si, Gyeonggi-do (KR)

(72) Inventor: Min-Hyung Guen, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 176 days.

(21) Appl. No.: 14/862,547

(22) Filed: Sep. 23, 2015

(65) Prior Publication Data

US 2016/0260941 A1    Sep. 8, 2016

(30) Foreign Application Priority Data

Mar. 6, 2015 (KR) .................. 10-2015-0031642

(51) Int. Cl.
*H01M 2/30* (2006.01)
*H01M 2/22* (2006.01)
*H01M 2/26* (2006.01)

(52) U.S. Cl.
CPC .............. *H01M 2/30* (2013.01); *H01M 2/22* (2013.01); *H01M 2/26* (2013.01)

(58) Field of Classification Search
CPC ............. H01M 2/22; H01M 2/26; H01M 2/30
USPC ......................................... 429/179
See application file for complete search history.

(56) References Cited

U.S. PATENT DOCUMENTS

2014/0308543 A1 * 10/2014 Yanagidani ............. H01M 2/08
429/7

FOREIGN PATENT DOCUMENTS

JP          09-147832 A    6/1997
KR    10-2006-0028176 A    3/2006

* cited by examiner

*Primary Examiner* — Basia Ridley
*Assistant Examiner* — James Erwin
(74) *Attorney, Agent, or Firm* — Lee & Morse, P.C.

(57) ABSTRACT

A rechargeable battery includes an electrode assembly including a first electrode and a second electrode, a case, a cap assembly including a cap plate, a first terminal outside the cap plate and electrically connected to the first electrode, and a second terminal outside the cap plate and electrically connected to the second electrode, a first connection terminal passing through the cap assembly and including one end connected to the first terminal and an other end positioned inside the case, a first current collecting member including one side connected to the first electrode and an other side rotatably coupled to the first connection terminal and electrically connecting the first connection terminal and the first electrode, and a rotation restriction member between the cap plate and first current collecting member, the rotation restriction member stopping rotation of the first current collecting member according to a predetermined angle of the rotation.

5 Claims, 7 Drawing Sheets ced batteryRECHARGEABLE BATTERY

CROSS-REFERENCE TO RELATED APPLICATION

Korean Patent Application No. 10-2015-0031642, filed on Mar. 6, 2015, in the Korean Intellectual Property Office, and entitled: "Rechargeable Battery," is incorporated by reference herein in its entirety.

BACKGROUND

1. Field

Embodiments relate to a reusable rechargeable battery.

2. Description of the Related Art

A rechargeable battery can be repeatedly charged and discharged, unlike a primary battery that is incapable of being recharged. A low capacity rechargeable battery has been used for small electronic devices such as a mobile phone, a laptop computer, and a camcorder, and a large capacity battery has been widely used as a power source for driving a motor of a hybrid vehicle.

The rechargeable battery, for example, generally includes a case receiving the electrode assembly and a cap assembly closing and sealing the case.

SUMMARY

Embodiments are directed to a rechargeable battery including an electrode assembly including a first electrode and a second electrode, a case in which the electrode assembly is received, a cap assembly including a cap plate covering an open portion of the case, a first terminal that protrudes outside the cap plate and is electrically connected to the first electrode, and a second terminal that protrudes outside the cap plate and is electrically connected to the second electrode, a first connection terminal passing through the cap assembly, the first connection terminal including one end connected to the first terminal and an other end positioned inside the case, a first current collecting member including one side connected to the first electrode and an other side rotatably coupled to the first connection terminal and electrically connecting the first connection terminal and the first electrode, and a rotation restriction member between the cap plate and first current collecting member, the rotation restriction member stopping rotation of the first current collecting member according to a predetermined angle of the rotation.

The rotation restriction member may include a base portion in a form of a circular plate, at least one first protrusion at a surface at which the first current collecting member contacts the base portion such that the rotation of the first current collecting member is temporarily stoppable, and a second protrusion that protrudes from the surface at which the first current collecting member contacts the base portion, the second protrusion restricting the first current collecting member.

A thickness of the second protrusion may be the same as a thickness of the first current collecting member.

The first protrusion may include a plurality of first protrusions. The plurality of first protrusions may be spaced apart by a predetermined angle with respect to the first connection terminal.

The first current collecting member may include a first hooking portion that extends from an edge of a portion of the first current collecting member that is coupled to the first connection terminal to contact the first protrusion, and a second hooking portion that extends from the edge of the portion of the first current collecting member that is coupled to the first connection terminal to contact the second protrusion.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
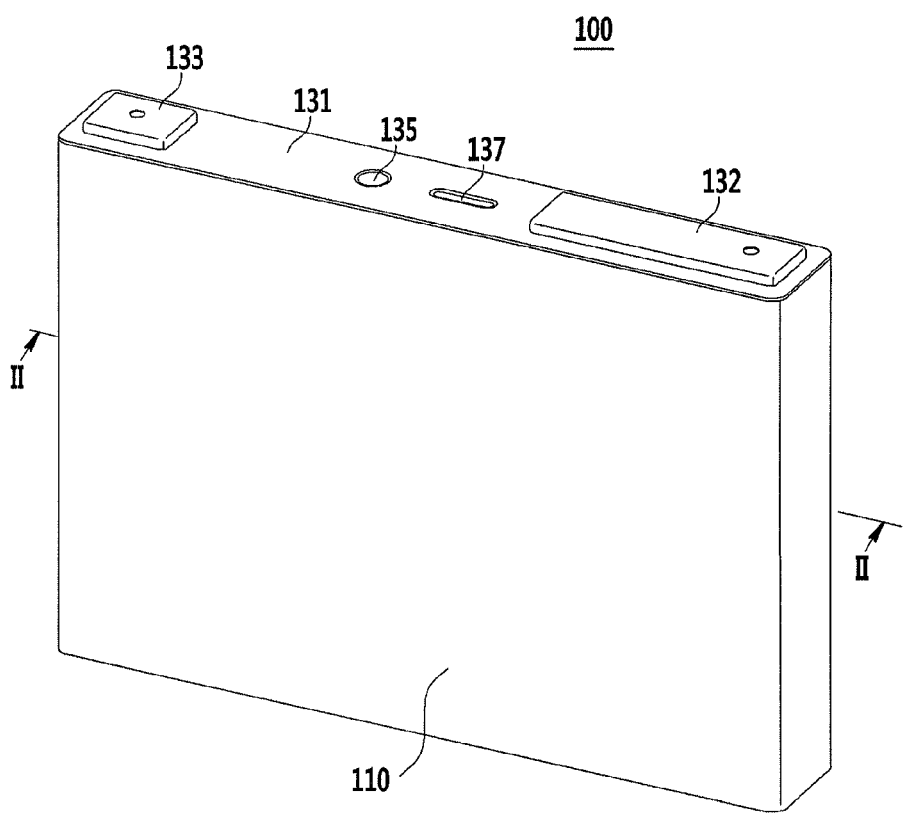
FIG. 1 illustrates a perspective view of a rechargeable battery according to an exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of regions may be exaggerated for clarity of illustration. Like reference numerals refer to like elements throughout.

When it is described that an element is "coupled" to another element, the element may be "directly coupled" to the other element or "indirectly coupled" to the other element through a third element.

Figure 2:
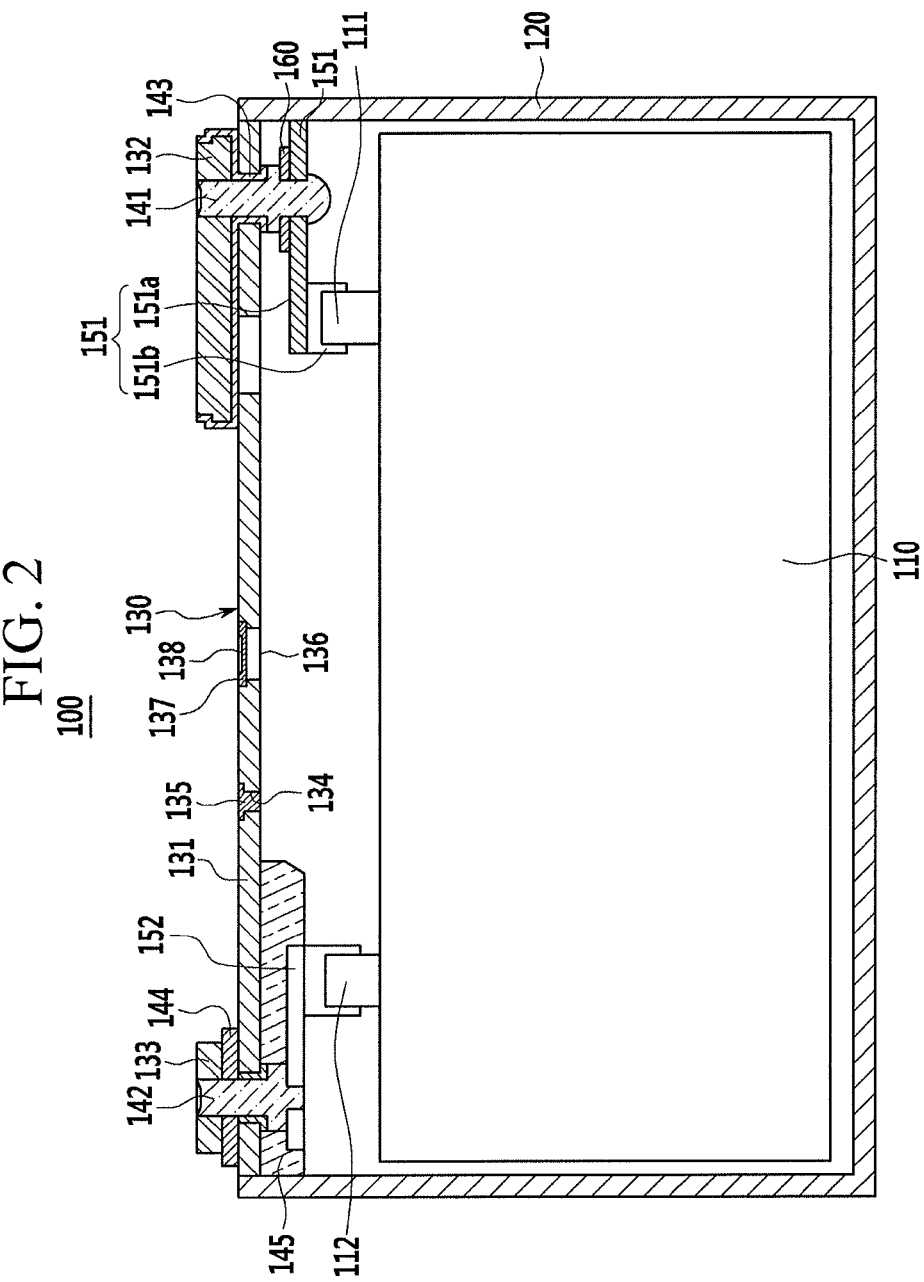
FIG. 2 illustrates a cross-sectional view of the rechargeable battery according to an exemplary embodiment shown in FIG. 1 taken along a line II-II.

FIG. 1 illustrates a perspective view of a rechargeable battery according to an exemplary embodiment, and FIG. 2 illustrates a cross-sectional view of the rechargeable battery according to an exemplary embodiment shown in FIG. 1 taken along a line II-II.

Referring to FIG. 1 and FIG. 2, a rechargeable battery 100 according to an exemplary embodiment may include an electrode assembly 110, a case 120, a cap assembly 130, a first connection terminal 141, a first current collecting member 151, and a rotation restriction member 160.

The rechargeable battery 100 according to an embodiment will be described by exemplifying a lithium ion rechargeable battery with an angular shape. In other implementations, the rechargeable battery may be various other types of batteries, such as a lithium polymer battery or a cylindrically shaped battery.

The electrode assembly 110 may include a first electrode 111 and a second electrode 112. A separator may be interposed between the first electrode 111 and the second electrode 112. The first electrode 111 may be a positive electrode and the second electrode 112 may be a negative electrode. In other implementations, the first electrode 111 may be a negative electrode and the second electrode 112 may be a positive electrode, depending on a design.

One side of the case 120 may be open. The case 120 may receive the electrode assembly 110. The case 120 have a shape of a cuboid, for example, and an opening may be formed in the upper surface of the case 120. A material of the case 120 may be a metal, for example, aluminum or stainless steel.

The cap assembly 130 may include a cap plate 131, a first terminal 132, and a second terminal 133.

The cap plate 131 may cover the open portion of the case 120. The shape of the cap plate 131 may be, for example, a plate shape that is elongated in one direction.

The cap plate 131 may include an electrolyte injection opening 134 and a vent hole 136. A sealing cap 135 may seal the electrolyte injection opening, and a vent plate 137 in which a notch 138 is formed to be ruptured at a predetermined pressure may be installed at the vent hole 136 in the cap plate 131.

The second terminal 133 may protrude outside the cap plate 131 and may be electrically connected to the second electrode 112 by way of a second connection terminal 142, and a second current collecting member 152. The second terminal 133 may have, for example, a rectangular plate shape.

The second connection terminal 142 may be connected to the second terminal 133. The second connection terminal 142 may electrically connect the second terminal 133 and the second electrode 112. The second connection terminal 142 may pass through the cap plate 131 and the second terminal 133, and the upper end thereof may be fixed to the second terminal 133.

A connection member 144 electrically connecting the second terminal 133 and the cap plate 131 may be installed under the second terminal 133. Accordingly, the cap plate 131 and the case 120 are have the same electrical charge as the second electrode 132. A lower insulating member 145 supporting the second current collecting member 152 may be installed under the cap plate 131.

The first terminal 132 may protrude outside the cap plate 131. The first terminal 132 may be electrically connected to the first electrode 111. The first terminal 132 may have, for example, a rectangular plate shape.

The first terminal 132 may be electrically connected to the positive electrode via a first current collecting member 151 that will be described below. Also, a second terminal 133 that will be described below may be electrically connected to the negative electrode via a second current collecting member 152. In some implementations, the first terminal 132 may be electrically connected to the negative electrode, and the second terminal 133 may be electrically connected to the positive electrode.

A hole may pass through the cap plate 131 and the first terminal 132. A sealing gasket 143 may be inserted and installed to provide a seal between the first terminal 132 and the cap plate 131 and between the cap plate 131 and a first connection terminal 132 passing through the hole.

The first connection terminal 141 may pass through the cap assembly 130. One end of the first connection terminal 141 may be connected to the first terminal 132, and the other end thereof may be positioned inside the case 120.

The first connection terminal 141 may electrically connect the first terminal 132 to the first electrode 111. The first connection terminal 141 may have a columnar shape. The upper end of the first connection terminal 141 may be fitted to the first terminal 132 and fixed to the first terminal 132 by welding.

The opposite end of the first connection terminal 141 may be fixed to the first current collecting member 151 by welding. The first current collecting member 151 may electrically connect the first connection terminal 141 and the first electrode 111.

One side of the first current collecting member 151 may be connected to the first electrode 111, and the other side of the first current collecting member 151 may be rotatably coupled to the first connection terminal 141. The first current collecting member 151 may electrically connect the first connection terminal 141 and the first electrode 111. By rotatably coupling the first current collecting member 151 to the first connection terminal 141 to be, the cap assembly 130 and the first current collecting member 151 may be relatively rotated.

The first current collecting member 151 may include, for example, an upper plate 151a and an electrode attachment portion 151b. The upper plate 151a may be coupled to the first connection terminal 141.

The upper plate 151a may have a quadrangular shape, and may be fixed to a lower portion of the first connection terminal 141 by welding. The upper plate 151a includes a hole, and in the state in which the protrusion formed under the first connection terminal 141 is fitted to the hole, the first connection terminal 141 and the upper plate 151a may be welded.

The electrode attachment portion 151b may be curved toward the electrode assembly 110 from the upper plate 151a to be coupled to the first electrode 111. The electrode attachment portion 151b may be bent to be parallel to the electrode assembly 110 from a width direction end of the upper plate 151a.

The rotation restriction member 160 may be interposed between the cap plate 131 and the first current collecting member 151 such that the first current collecting member 151 is rotatable and the rotation is stepped according to a predetermined angle. The first current collecting member 151 and the rotation restriction member 160 may be coupled to the cap assembly 130 by a rivet, as an example. The rivet 170 may be positioned to sequentially pass through the first current collecting member 151 and the rotation restriction member 160.

In the rechargeable battery 100 made of the above-described structure according to an exemplary embodiment, the first current collecting member 151 may be rotatably coupled with respect to the cap assembly 130. Accordingly, in the state in which the first current collecting member 151 is rotated with respect to the cap assembly 130, the electrode assembly 110 and the first current collecting member 151 may be connected. Accordingly, interference with surrounding members may be minimized in the connection process, and the manufacturing process may be easily performed.

Also, in the state in which a portion of the first current collecting member 151 is already manufactured in the bent shape, the first current collecting member 151 may be connected to the electrode assembly 110, thereby allowing a bending process after the assembly to be omitted, differently from a manufacturing process of a general rechargeable battery. Accordingly, the manufacturing process may be easily performed compared with the manufacturing process of the conventional rechargeable battery.

Also, in the manufacturing process of the general rechargeable battery, the bending is performed after the first current collecting member and the electrode assembly are coupled. Therefore, when the rechargeable battery is installed in a vehicle, durability against vibration may be weak in the bent portion. However, in the rechargeable battery 100 according to an exemplary embodiment, by connecting the first current collecting member 151 that is completely bent and manufactured to sufficiently maintain the durability for the variation differently from the conventional rechargeable battery to the electrode assembly 110, the durability against vibration may be remarkably improved.

Further, in the rechargeable battery according to an exemplary embodiment, by omitting the bending process of the first current collecting member 151, differently from the previous design, the first current collecting member 151 may be prevented from being bent such that the space occupied by the electrode assembly 110 is reduced.

Figure 3:
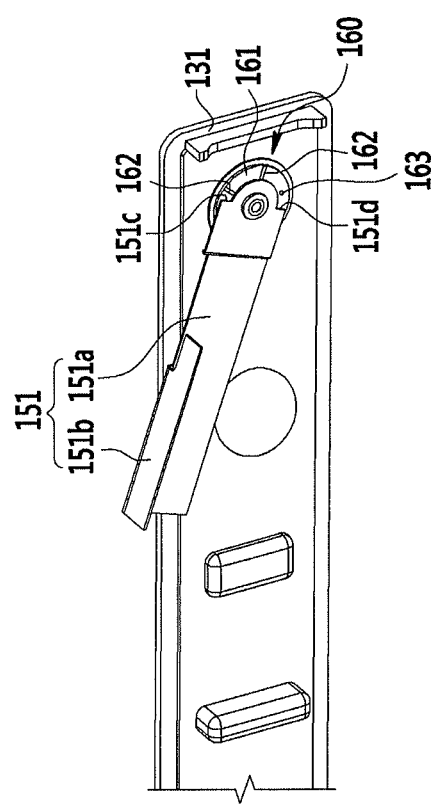
FIG. 3 illustrates a view showing a cap assembly and a first current collecting member shown in, FIG. 1.
Figure 4:
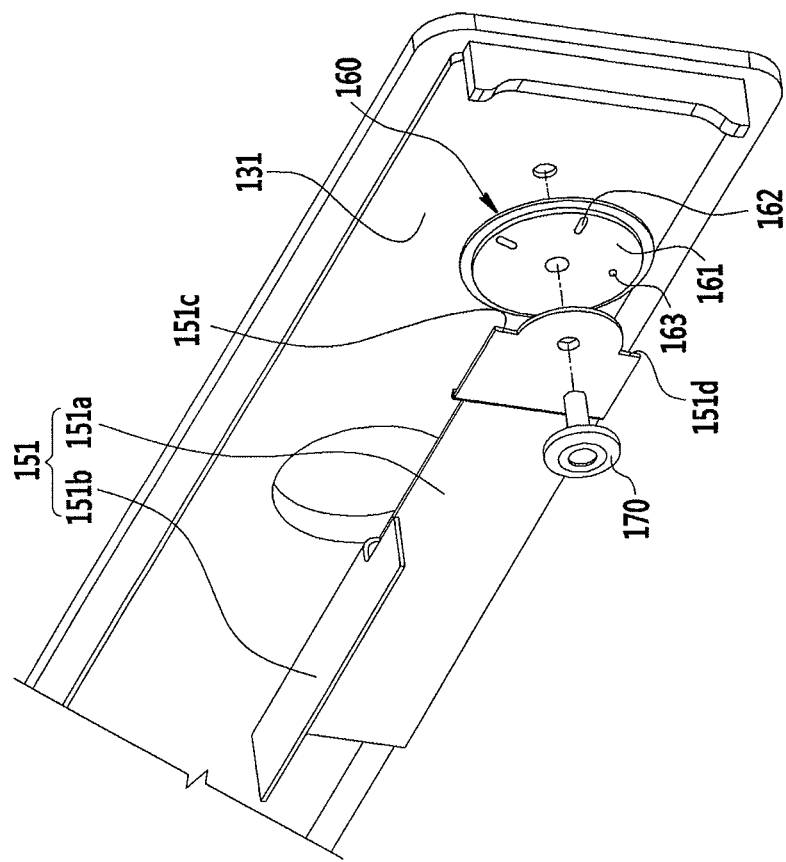
FIG. 4 illustrates an exploded perspective view showing a cap assembly and a first current collecting member in the rechargeable battery according to an exemplary embodiment shown in FIG. 3.

FIG. 3 illustrates a view showing a cap assembly and a first current collecting member shown in FIG. 1. FIG. 4 illustrates an exploded perspective view showing a cap assembly and a first current collecting member in the rechargeable battery according to an exemplary embodiment shown in FIG. 3.

Referring to FIG. 3 and FIG. 4, the described rotation restriction member 160 may include a base portion 161, a first protrusion 162, and a second protrusion 163.

The base portion 161 may have a shape of a circular plate, for example. The base portion 161 may be interposed between the cap plate 131 and the first current collecting member 151. A diameter of the base portion 161 may correspond to a width of the first current collecting member 151.

The base portion 161 may be fixed to the cap plate 131. Accordingly, the first current collecting member 151 may be rotatable with respect to the base portion 161.

The first protrusion 162 may be formed on a surface at which the first current collecting member 151 contacts the base portion 161. The first protrusion 162 may temporarily stop the rotation of the first current collecting member 151.

The first protrusion 162 may be plural, and the plurality of first protrusions 162 may be separated by a predetermined angle with respect to the first connection terminal 141. For example, there are two first protrusions 162, and the two first protrusions 162 may be spaced apart by 20° with respect to the first connection terminal 141. The number of first protrusions and the separation angle of the plurality of first protrusions 162 may be varied.

When there are two first protrusions 162, the first current collecting member 151 may maintain the stopped state in a predetermined position by any one of the first protrusions 162. If the first current collecting member 151 is rotated by an external force, this rotation may be stopped again by the next first protrusion 162. For example, the first protrusion 162 may not limit the rotation of the first current collecting member 151, and the rotation may be temporarily stopped.

The second protrusion 163 may be formed to protrude from the surface on which the first current collecting member 151 contacts the base portion 161. The second protrusion 163 may limit the rotation of the first current collecting member 151. For this purpose, the second protrusion 163 may protrude to a greater thickness rather than the first protrusion 162. For example, the thickness of the second protrusion 163 may be the same as the thickness of the first current collecting member 151. The thickness of the first protrusion 162 may be less than the thickness of the first current collecting member 151.

The first current collecting member 151 may include a first hooking portion 151*c* and a second hooking portion 151*d*.

The first hooking portion 151*c* may extend from an edge of a portion of the first current collecting member 151 that is coupled to the first connection terminal 141. The first hooking portion 151*c* may contact the first protrusion 162.

The second hooking portion 151*d* may extend from an edge of a portion of the first current collecting member 151 that is coupled to the first connection terminal 141. The second hooking portion 151*d* may contact the second protrusion 163. When the second hooking portion 151*d* and the second protrusion 163 are in contact, the rotation of the first current collecting member 151 may be stopped.

A process of assembling the cap assembly 130 and the electrode assembly 110 in the rechargeable battery 100 according to an exemplary embodiment will be described with reference to FIG. 5.

Figure 5:
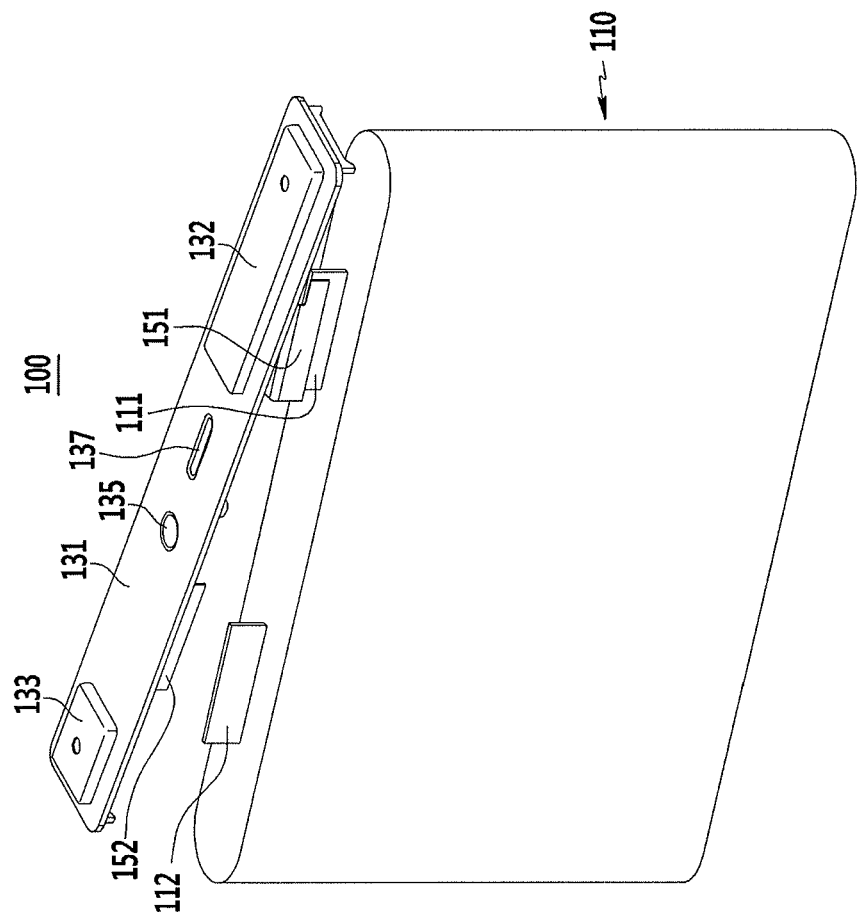
FIG. 5 illustrates a view showing a state in which an electrode assembly and a first current collecting member are combined in a state in which the first current collecting member is rotated in one direction with respect to the cap assembly.

FIG. 5 illustrates a view showing a state in which an electrode assembly and a first current collecting member are combined in a state in which the first current collecting member 151 is rotated in one direction with respect to the cap assembly.

As shown in FIG. 5, in the state in which the first current collecting member 151 is rotated by the predetermined angle with respect to the cap assembly 130, the first current collecting member 151 and the electrode assembly 110 may be connected. In the process in which the user connects the first current collecting member 151 and the electrode assembly 110, interference with the surrounding members may be minimized such that the connection process may be easily performed.

Figure 6:
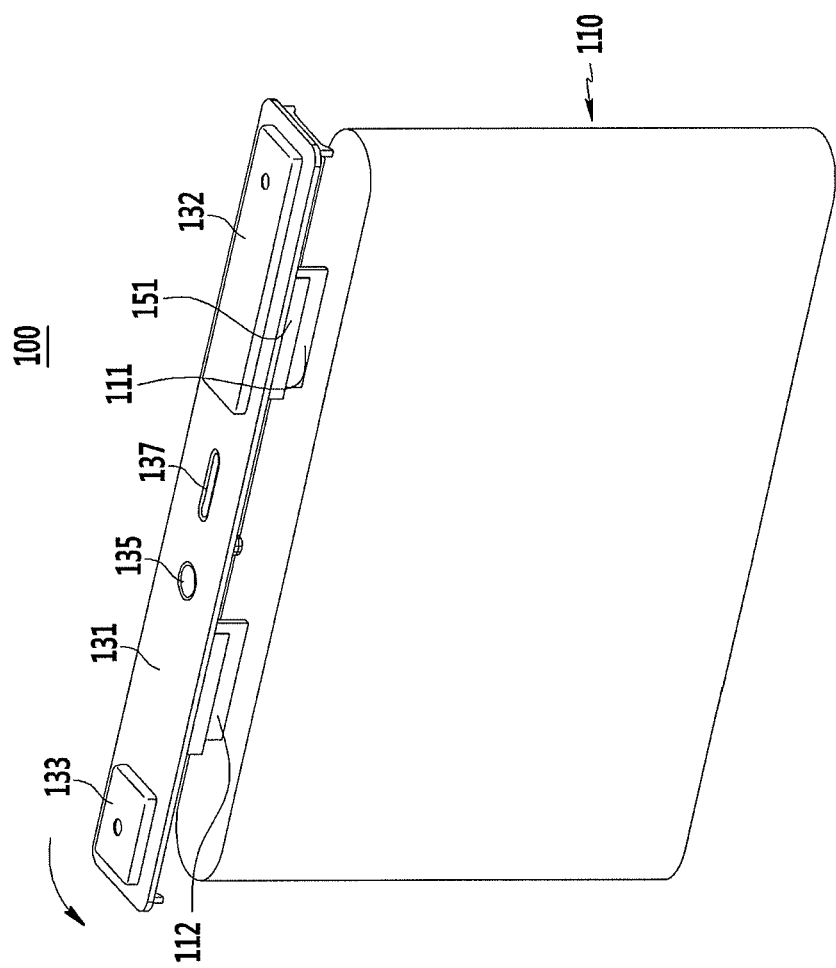
FIG. 6 illustrates a view showing a state in which the cap assembly is rotated with respect to the first current collecting member in FIG. 5.
Figure 7:
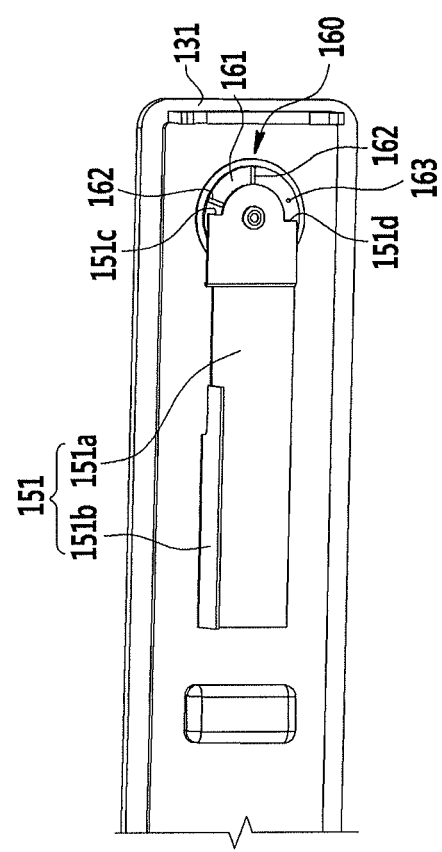
FIG. 7 illustrates a view only showing the cap assembly and the first current collecting member in FIG. 6.

FIG. 6 illustrates a view showing a state in which the cap assembly is rotated with respect to the first current collecting member in FIG. 5, and FIG. 7 illustrates a view showing the cap assembly and the first current collecting member in FIG. 6.

Referring to FIG. 6 and FIG. 7, in the state in which the first current collecting member 151 and the electrode assembly 110 are connected, the cap assembly 130 is rotated. The case 120 (referring to FIG. 1) and the cap assembly 130 may be coupled, thereby completing the assembling of the rechargeable battery 100.

By way of summation and review, in a general assembling of a rechargeable battery, an uncoated region formed in one side of the electrode assembly may be connected to the current collecting member coupled to the cap assembly.

In this general process, after welding the uncoated region and the current collecting member to each other, a process of bending a portion of the current collecting member is performed. The bending process may not be easy because of the presence of the cap assembly and the case.

Also, the assembly may be difficult depending on the bending angle of the uncoated region, and a short may be generated in the negative electrode portion. Further, a space occupied by the electrode assembly may be reduced depending on the bending angle of the uncoated region such that ensuring sufficient capacity is difficult.

Embodiments provide a rechargeable battery that is easily assembled. In the rechargeable battery according to embodiments, the first current collecting member is coupled to be rotatable with respect to the cap assembly. Accordingly, in the state in which the first current collecting member is rotated with respect to the cap assembly, the electrode assembly and the first current collecting member may be connected and the interference with the surrounding members may be minimized, thereby easily performing the manufacturing process.

Also, by connecting the first current collecting member to the electrode assembly in the already bent state, a bending process after the assembling may be omitted, differently from the manufacturing process of a general rechargeable battery, such that the manufacturing process may be easily performed.

Further, in a general manufacturing process of a general rechargeable battery the bending is performed after coupling the first current collecting member and the electrode assembly. Therefore, when the rechargeable battery is installed into a vehicle, durability against vibration may be weak in the bent portion. However, in the rechargeable battery according to an exemplary embodiment, differently from a general rechargeable battery, by connecting the first current collecting member that is already bent is coupled to the electrode assembly, the durability against vibration may be improved.

Example embodiments have been disclosed herein, and although specific terms are employed, they are used and are to be interpreted in a generic and descriptive sense only and not for purpose of limitation. Accordingly, it will be understood by those of skill in the art that various changes in form and details may be made without departing from the spirit and scope thereof as set forth in the following claims.

What is claimed is:

1. A rechargeable battery, comprising:
    an electrode assembly including a first electrode and a second electrode;
    a case in which the electrode assembly is received;
    a cap assembly including a cap plate covering an open portion of the case, a first terminal that protrudes outside the cap plate and is electrically connected to the first electrode, and a second terminal that protrudes outside the cap plate and is electrically connected to the second electrode;
    a first connection terminal passing through the cap assembly, the first connection terminal including one end connected to the first terminal and an other end positioned inside the case;
    a first current collecting member including one side connected to the first electrode and an other side rotatably coupled to the first connection terminal and electrically connecting the first connection terminal and the first electrode; and
    a rotation restriction member between the cap plate and first current collecting member, the rotation restriction member stopping a rotation of the first current collecting member according to a predetermined angle of the rotation.

2. The rechargeable battery as claimed in claim 1, wherein the rotation restriction member includes:
    a base portion in a form of a circular plate,
    at least one first protrusion at a surface at which the first current collecting member contacts the base portion such that the rotation of the first current collecting member is temporarily stoppable, and
    a second protrusion that protrudes from the surface at which the first current collecting member contacts the base portion, the second protrusion restricting the rotation of the first current collecting member.

3. The rechargeable battery as claimed in claim 2, wherein:
    a thickness of the second protrusion is the same as a thickness of the first current collecting member.

4. The rechargeable battery as claimed in claim 2, wherein:
    the first protrusion includes a plurality of first protrusions, and
    the plurality of first protrusions are spaced apart by a predetermined angle with respect to the first connection terminal.

5. The rechargeable battery as claimed in claim 2, wherein the first current collecting member includes:
    a first hooking portion that extends from an edge of a portion of the first current collecting member that is coupled to the first connection terminal to contact the first protrusion, and
    a second hooking portion that extends from the edge of the portion of the first current collecting member that is coupled to the first connection terminal to contact the second protrusion.

* * * * *